March 2, 1937.  J. L. OWÉN  2,072,624
SAW BLADE
Original Filed Dec. 1, 1933
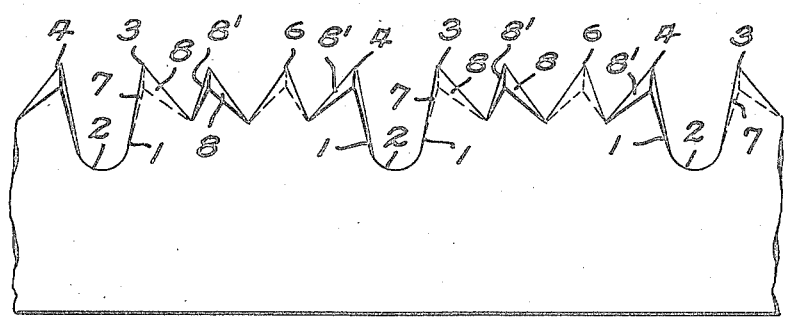
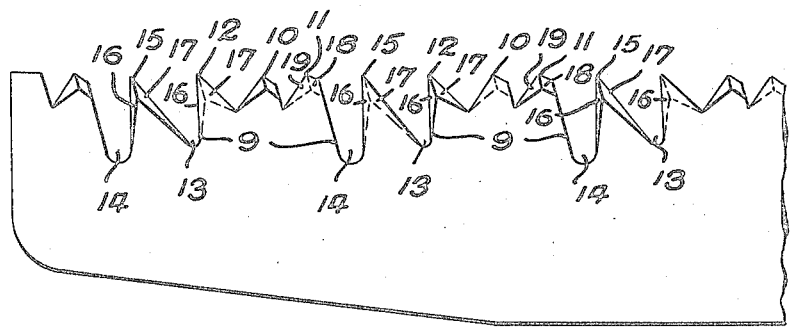
INVENTOR Patented Mar. 2, 1937

2,072,624

UNITED STATES PATENT OFFICE 2,072,624
SAW BLADE

Jonas Leander Owén, Norredsbyn, Sweden

Application December 1, 1933, Serial No. 700,501.
Renewed July 23, 1936. In Sweden December 1, 1932

1 Claim. (Cl. 143—133)

This invention relates to improvements in cross cut saws and similarly shaped cutting or sawing tools.

The object of the invention is to increase the cutting capacity and to eliminate or at least to considerably reduce the usual vibration or "jolting" of saw blades, which have the cutting edge of the blade divided into a number of equally wide cutting parts separated by notches, with each cutting part divided into a number of triangular teeth, each tooth with both its edges beveled on the same side of the saw blade, and with the separate teeth beveled on alternate sides of the saw blade, the characteristic feature of the invention being, that the above mentioned separate teeth are equally wide at the base but have their tips so arranged, that in each of the above mentioned cutting parts the mutual distance between the tips belonging to a group formed by two or several teeth adjoining a notch, will be the same in symmetrical portions of said cutting parts along their longitudinal direction, but different from the mutual distance between the other teeth in the same cutting part, in addition to which the teeth in each group are provided with sharp, cutting edges along the slanting sides pointing in the same longitudinal direction of the saw blade, with said edges facing each other in different groups, and with the other slanting side of each tooth provided with an obtuse, chiefly raking edge.

This peculiar arrangement of the teeth increases the cutting capacity to a considerable extent, and the difference in the mutual distances of the tips of the teeth prevents the same from forming a wavy bottom in the kerf, which is otherwise caused by knots and variations in the hardness of the wood, giving instead a straight and smooth kerf in which the saw blade is able to move without vibrations or "jolting", whereby the sawing is facilitated.

Typical forms of the invention are illustrated in the accompanying drawing, in which Fig. I shows part of a saw blade according to the invention, and Fig. II a hand-saw of a similar arrangement.

Referring more particularly to the drawing, 1 denotes the cutting parts, separated by notches 2, which widen towards the cutting edge of the saw blade, an arrangement which facilitates a continuous removal of the saw dust from the kerf. Each cutting part is divided into a number of teeth 3, 4, 5, 6, the bases of which are of uniform width, i. e. equally wide for all the teeth. The teeth 3, 5 form one group, and the teeth 4, 6 another, both being adjacent to a notch on each side of the cutting part. The distance between the tips 5, 6 of the interposed teeth is different from the distance between the tips in the adjacent groups. In the teeth 3 and 5 the slanting sides 7, 8' possess an obtuse, raking edge and the sides 8 a sharp, cutting edge, the respective edges in one group facing the corresponding kind of edge in the other group.

In Fig. II the cutting parts 9 are divided into a number of teeth 10, 11, 12, of which the two teeth 10, 11 having blunt, i. e. obliquely cut tips, are provided with long, sharp edges 19 intended for cutting while the blade is moving to the left as shown on the drawing, during which motion the teeth 12 will rake out the saw dust. Because of the high efficiency of such a saw blade a considerable amount of saw dust will result, for which reason sharply slanting raking teeth cutting chiefly on one side are arranged between the cutting parts 9 bordered on each side by large notches 13, 14. These latter teeth 15 as well as the teeth 12, which serve the same purpose, are on the left side, as shown on the drawing, provided with obtuse edges 16 and on the other side with cutting or obtuse edges 17, which latter edges, as well as the short, sharp edges 18 will cut such portions as may have possibly been left uncut by the other teeth. The short edges 18 will also serve to reinforce the top portion of the tooth. The difference in the mutual distance between the tips 10—11 and 10—12 will produce a level bottom of the kerf thus preventing waviness and vibration.

It is evident that various changes may be resorted to without materially departing from the principles of the invention.

Having thus described my invention what I claim and desire to secure by Letters Patent is:

A saw blade having teeth divided by gaps into sections having symmetrical groups of at least four teeth each, said teeth being triangular and having all faces inclined, the bases of the teeth being of equal width, and those bases within each section contacting each other, the points of the teeth of each group of two teeth adjacent a gap being equally spaced, and the points of the intermediate teeth in each section being spaced from each other differently from the spacing of the points of the teeth forming said group adjacent a gap.

JONAS LEANDER OWÉN.